United States Patent [19]

Gellert

[11] Patent Number: 5,049,062
[45] Date of Patent: Sep. 17, 1991

[54] INJECTION MOLDING SYSTEM HAVING SPRING BIASED NOZZLES

[76] Inventor: Jobst U. Gellert, 7A Prince Street, Georgetown, Ontario, Canada, L7G 2X1

[21] Appl. No.: 681,634

[22] Filed: Apr. 3, 1991

Related U.S. Application Data

[63] Continuation of Ser. No. 489,548, Mar. 7, 1990, abandoned.

[30] Foreign Application Priority Data

Feb. 27, 1990 [CA] Canada ................................ 2010855

[51] Int. Cl.$^5$ ............................................ B29C 45/22
[52] U.S. Cl. .................................. 425/549; 425/563; 425/564; 425/566; 425/572
[58] Field of Search ............... 425/549, 552, 562, 563, 425/564, 566, 572; 264/328.15

[56] References Cited

U.S. PATENT DOCUMENTS

| | | | |
|---|---|---|---|
| 2,940,123 | 6/1960 | Beck et al. | 425/564 |
| 3,941,540 | 3/1976 | Driscoll et al. | 425/563 |
| 3,954,209 | 5/1976 | Ramond | 425/563 |
| 4,010,903 | 3/1977 | Sakuri et al. | 425/563 |
| 4,622,001 | 11/1986 | Bright et al. | 425/552 |
| 4,688,622 | 8/1987 | Gellert | 164/61 |
| 4,768,945 | 9/1988 | Schmidt et al. | 425/549 |
| 4,786,246 | 11/1988 | Gellert | 425/549 |
| 4,787,840 | 11/1988 | Gellert | 425/549 |
| 4,836,766 | 6/1989 | Gellert | 425/549 |

Primary Examiner—Timothy Heitbrink
Attorney, Agent, or Firm—Dalesman & Company

[57] ABSTRACT

A multi-cavity injection molding system or apparatus having a spring and sealing housing mounted between each nozzle and the manifold. Each nozzle reciprocates between a retracted open position and a forward closed position in which the tapered forward end is seated in a gate. The nozzle has a central sleeve portion with a bore which projects rearwardly into a matching bore in the housing. Disc springs received in a channel in the housing which extend around the sleeve portion of the nozzle biases the nozzle to the closed position. Thus, during each cycle injection pressure drives each nozzle to the retracted open position, and then the spring bias drives it to the forward closed position when the injection pressure is released. The spring and sealing housing avoids leakage and misalignment as the nozzle reciprocates.

7 Claims, 2 Drawing Sheets

INJECTION MOLDING SYSTEM HAVING SPRING BIASED NOZZLES

This application is a continuation of application Ser. No. 07/489,548, filed on Mar. 7, 1990, now abandoned.

BACKGROUND OF THE INVENTION

This invention relates generally to injection molding and more particularly to a multi-cavity injection molding system or apparatus having spring biased reciprocating nozzles.

Injection molding systems having spring loaded valve members are well known in the art. An early example is shown in U.S. Pat. No. 2,940,123 to Beck et al. which issued June 14, 1960. A more recent example is described in the applicant's Canadian patent application serial number 601,625 filed June 2, 1989 entitled "Injection Molding System Having Offset Valve Pin Biasing Mechanism". It is also known to have systems wherein the nozzles are reciprocated to provide valve gating. For instance, the applicant's U.S. Pat. No. 4,786,246 which issued Nov. 22, 1988 discloses an arrangement wherein the nozzles are secured to a common manifold, and the manifold is activated by hydraulic pistons. The applicant's U.S. Pat. No. 4,787,840 which issued Nov. 29, 1988 shows a single nozzle which is valve gated by the relative rotation between two threaded collars, the inner one being attached to the nozzle and the outer one being rotated by a piston actuated arm. The applicant's U.S. Pat. No. 4,836,766 which issued June 6, 1989 describes an injection molding system having two nozzles arranged in tandem, wherein the forward nozzle is reciprocated by a pneumatic piston. While these previous systems for reciprocating the nozzles work well for particular applications, they have the disadvantage that they are relatively costly to make and maintain because of the actuating mechanism.

SUMMARY OF THE INVENTION

Accordingly, it is an object of the invention to at least partially overcome the problems of the prior art by providing a multi-cavity injection molding system or apparatus wherein the nozzles reciprocate and are each biased towards a forward closed position by a spring received in a spring and sealing housing mounted between each nozzle and the manifold.

To this end, in one of its aspects, the invention provides a multi-cavity injection molding apparatus having a nozzle with an integral heating element the nozzle being received in a cavity plate between the manifold and each cavity, each nozzle having a rear end and a tapered forward end in alignment with a gate leading to the respective cavity, wherein pressurized melt from a molding machine flows through a melt passage extending through the manifold and a bore extending through each nozzle to the gate leading to each cavity, the improvement wherein each nozzle is received in an opening in the cavity plate to reciprocate between a retracted open position and a forward closed position wherein the tapered forward end of the nozzle is seated in a respective gate, a spring and sealing housing is mounted between each nozzle and the manifold, each spring and sealing housing having a central bore, a rear face and a forward face, the rear face of the spring and sealing housing being secured against the manifold with the central bore of the housing in alignment with an outlet from the melt passage extending through the manifold, the forward face of the spring and sealing housing having a spring channel therein which extends around and is separate from the central bore of the housing, spring means mounted in the spring channel to apply a bias to the rear end of the nozzle to drive the nozzle to the forward closed position, the bore of the nozzle extending through a central sleeve portion which extends rearwardly into the central bore of the spring and sealing housing, the central sleeve portion of the nozzle having an outer surface which seals against an inner surface of the bore of the spring and sealing housing to prevent melt leakage therebetween as the nozzle reciprocates between the open and closed positions.

Further objects and advantages of the invention will appear from the following description taken together with the accompanying drawings.

DETAILED DESCRIPTION OF THE DRAWINGS

Figure 1:
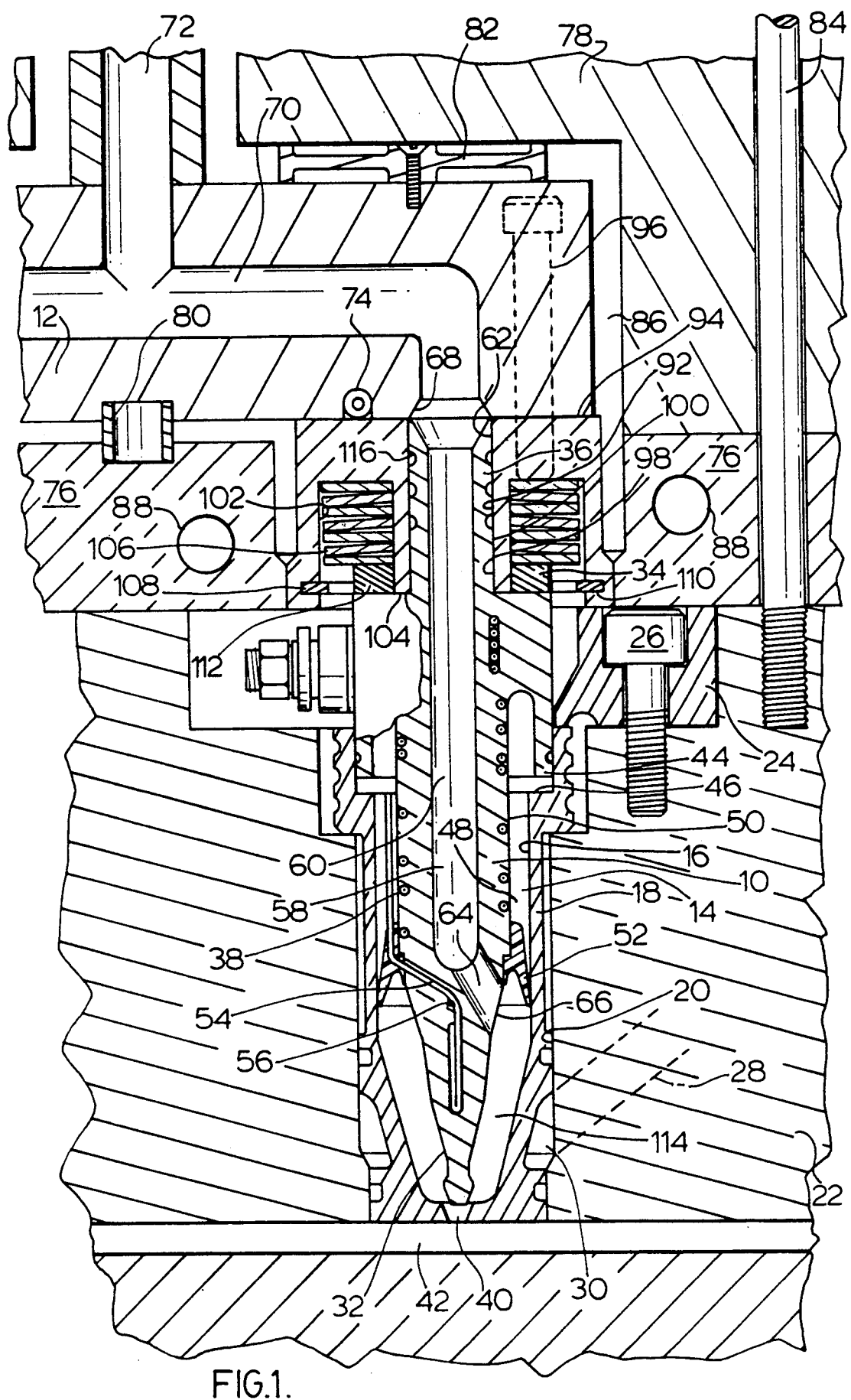
FIG. 1 is a sectional view of a portion of a multi-cavity injection molding system according to one embodiment of the invention.
Figure 2:
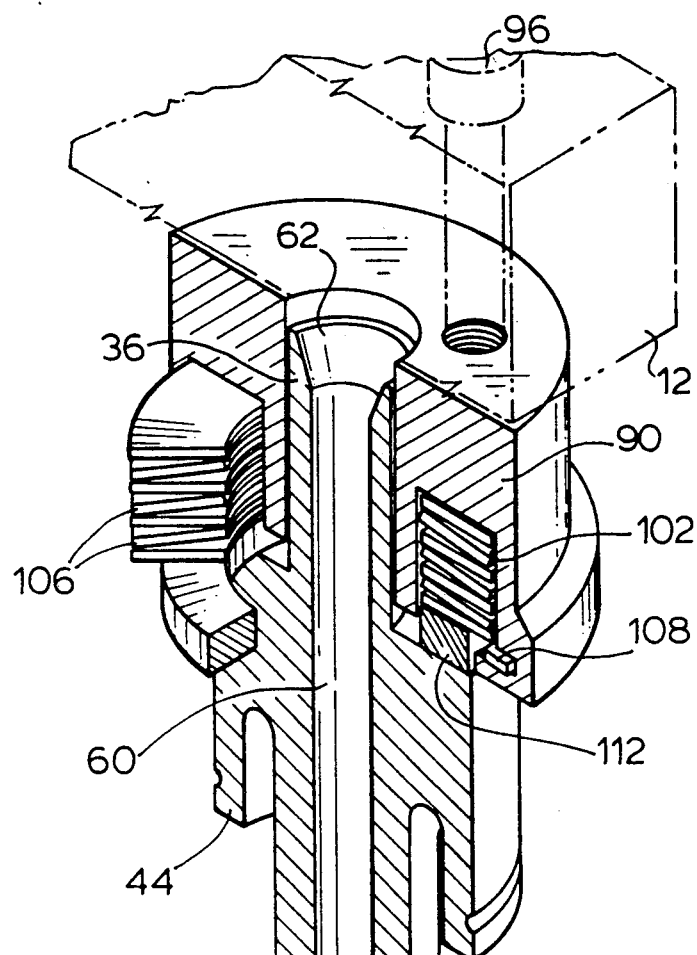
FIG. 2 is an exploded isometric view showing a spring and sealing housing in position to be mounted between the nozzle and manifold seen in FIG. 1.

Reference is first made to FIG. 1 which shows a portion of a multi-cavity injection molding system according to a first embodiment of the invention wherein a number of heated nozzles 10 extend from a common elongated heated manifold 12. In this embodiment, each nozzle 10 is seated in a well 14 having an inner surface 16 in a gate insert 18. A different gate insert is shown in the Mold-Masters' Canadian patent application serial number 606,082 filed July 19, 1989 entitled "Injection Molding System Having Fluid Cooled Inserts". The gate insert 18 is, in turn seated in an opening 20 in a cavity plate 22. The gate insert 18 is held securely in place in the opening 20 by a locating collar 24 which is secured to the cavity plate 22 by bolts 26. The gate insert 18 and the surrounding cavity plate 22 are cooled by pumping cooling water from a conduit 28 to circulate around a channel 30 between them.

Each steel nozzle 10 has a tapered forward end 32 and a rear end 34 from which a sleeve portion 36 extends, as described in more detail below. The nozzle 10 is heated by a helical electric heating element 38 which is integrally cast into it as described in the applicant's U.S. Pat. No. 4,688,622 which issued Aug. 25, 1987. The nozzle 10 reciprocates between the retracted open position shown and a forward closed position in which the tapered forward end 32 is seated in a gate 40 leading to a cavity 42 and an insulating bushing 44 sits against a circumferential shoulder 46. An insulative space 48 is provided between the outer surface 50 of the nozzle and the inner surface 16 of the gate insert. This space 48 is bridged by a circumferential insulating, sealing and locating flange 52 which extends outwardly from the nozzle 10 into sealing contact with the inner surface 16 of the gate insert 18, similar to that shown in the applicant's U.S. Pat. No. 4,768,945 which issued Sept. 6, 1988. A thermocouple 54 extends through the space 48 into a hole 56 which extends diagonally into the tapered forward end 32 of the nozzle to monitor its temperature during operation.

A melt bore 58 extends longitudinally through each nozzle 10. The bore 58 has a central portion 60 which extends from a tapered inlet 62 in the rearwardly projecting sleeve portion 36 and a diagonal portion 64 which extends through an outlet 66 to a front portion 114 of the insulative space 48 forwardly of the circumferential flange 52. As can be seen, the inlet 62 to each nozzle 10 is aligned with a tapered outlet 68 from a melt channel 70 which branches out in the manifold 12 to convey pressurized melt received at a central inlet 72 from a molding machine (not shown). The manifold 12 is heated by an integral electrical heating element 74 and is secured in place between a support plate 76 and a back plate 78 by a locating ring 80 and a titanium pressure pad 82. The back plate 78 is held in place by bolts 84 extending into the cavity plate 22. An insulative air space 86 is provided between the hot manifold 12 and the adjacent support plate 76 and back plate 78 which are also cooled by pumping cooling water through cooling conduits 88.

A steel spring and sealing housing 90 is mounted between the manifold 12 and each nozzle 10. Each housing 90 has a central bore 92 and a rear face 94. The rear face 94 is secured to the manifold 12 by bolts 96 with the central bore 92 in alignment with one of the outlet 68 from the melt channel 70. The bore 92 is made with an inner surface 98 having a diameter to match that of the tapered outlet 68, and also to snugly receive the cylindrical outer surface 100 of the sleeve portion 36 which extends rearwardly from the rear end 34 of the nozzle 10. Thus, the inner surface 98 and the outer surface 100 form a seal against the leakage of pressurized melt between them as the nozzle reciprocates back and forth. Each spring and sealing housing 90 also has a cylindrical channel 102 extending rearwardly from its front face 104 around the central bore 92. In this embodiment, a series of disc springs 106 are received in the channel 102 and retained in place by a snap ring 108 received in a groove 110. A washer 112 is mounted inside the snap ring 108 to transmit the force from the springs 106 to the rear end 34 of the nozzle 10. Of course, other suitable spring arrangements, such as a coil spring, can be used in other embodiments. Locating the springs in the channel 102 around the central bore 92 ensures the bias applied to the rear end 34 of the nozzle is substantially uniform so that wear is uniform and the nozzle 10 remains in accurate alignment at both ends.

In use, after the system has been assembled as shown, electrical power is applied to the heating element 38 in each nozzle and to the heating element 74 in the manifold 12 to heat the nozzles 10 and the manifold 12 to a predetermined operating temperature. Pressurized melt from a molding machine (not shown) is injected into the melt channel 70 in the manifold according to a predetermined cycle. The pressurized melt flows through the bore 58 of each nozzle into the front portion 114 of the space 48 which extends around the tapered forward end 32 of the nozzle. The force of the melt against the tapered forward ends 32 is sufficient to overcome the bias of the springs 106 and pushes the nozzles 10 to the retracted open position. The melt then flows through the gates 40 and fills the cavities 42. After the cavities 42 are filled, injection pressure is held momentarily to pack and then released. With the melt pressure released, the force of the springs 106 drives the nozzles 10 forward to the closed position in which the forward end 32 of each nozzle 10 is seated in a gate 40 to seal off the gate. After a short cooling period, the mold is opened to eject the molded products. Following ejection, the mold is closed and injection pressure is reapplied to refill the cavities. The cycle is repeated continuously with a cycle time dependent on the size and shape of the cavities 42 and the type of material being molded. As mentioned above, the diameter of the bore 92 through each spring and sealing housing 90 matches that of the tapered outlet 68 of the melt channel 70, and it also matches the tapered inlet 62 in the sleeve portion 36 to the melt bore 58. Thus, no dead spot having sharp corners for the melt to deteriorate is provided when the nozzle moves away from the retracted open position. The outer surface 100 of the sleeve portion 36 also has circumferentially extending sealing grooves 116 to prevent melt leakage between it and the surrounding inner surface 98 of the bore 92 as the nozzle reciprocates.

While the description of the system has been given with respect to one embodiment, it is not to be construed in a limiting sense. Variations and modifications will occur to those skilled in the art. For instance, in other embodiments alternate gate configurations can be used in which a gate insert is not used. Reference is made to the appended claims for a definition of the invention.

What I claim is:

1. In a multi-cavity injection molding apparatus having a plurality of nozzles, each nozzle having an integral heating element and being received in a cavity plate between a manifold and a respective cavity, each nozzle having a rear end and a tapered forward end in alignment with a gate leading to the respective cavity, wherein pressurized melt from a molding machine flows through a melt passage extending through the manifold and a bore extending through each nozzle to the gate leading to each cavity, the improvement wherein:

each nozzle is received in an opening in the cavity plate to reciprocate between a retracted open position and a forward closed position wherein the tapered forward end of the nozzle is seated in a respective gate, a spring and sealing housing is mounted between each nozzle and the manifold, each spring and sealing housing having a central bore, a rear face and a forward face, the rear face of the spring and sealing housing being secured against the manifold with the central bore of the housing in alignment with an outlet from the melt passage extending through the manifold, the forward face of the spring and sealing housing having a spring channel therein which extends around and is separate from the central bore of the housing, spring means mounted in the spring channel to apply a bias to the rear end of the nozzle to drive the nozzle to the forward closed position, the bore of the nozzle extending through a central sleeve portion which extends rearwardly into the central bore of the spring and sealing housing, the central sleeve portion of the nozzle having an outer surface which seals against an inner surface of the bore of the spring and sealing housing to prevent melt leakage therebetween as the nozzle reciprocates between the open and closed positions.

2. The multi-cavity injection molding apparatus as claimed in claim 1 wherein a snap ring is mounted to extend into the spring channel to retain the spring means in the spring channel.

3. The multi-cavity injection molding apparatus as claimed in claim 2 wherein a washer is positioned inside the snap ring between the spring means and the rear face of the nozzle to transmit force from the spring means to the nozzle.

4. The multi-cavity injection molding apparatus as claimed in claim 3 wherein the spring means comprises a plurality of disc springs received in the spring channel.

5. The multi-cavity injection molding apparatus as claimed in claim 1 wherein each nozzle is received in a fluid cooled gate insert which is seated in each opening in the cavity plate, the gate insert having an inner surface which extends inwardly to the gate.

6. The multi-cavity injection molding apparatus as claimed in claim 5 wherein the bore through each nozzle extends to an outlet into an insulative space which extends between the nozzle and the inner surface of the surrounding gate insert, and the nozzle has a circumferentially sealing and locating flange which extends outward across the insulative space into sliding contact with the inner surface of the gate insert.

7. The multi-cavity injection molding apparatus as claimed in claim 6 wherein a locating collar is secured to the cavity plate around each nozzle to retain the gate insert in place in the opening in the cavity plate.

* * * * *